US010984165B1

(12) United States Patent
Margalit

(10) Patent No.: US 10,984,165 B1
(45) Date of Patent: Apr. 20, 2021

(54) DIGITAL RIGHTS MANAGEMENT FOR PRINTED CIRCUIT BOARDS

(71) Applicant: International Business Machines Corporation, Armonk, NY (US)

(72) Inventor: Oded Margalit, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/775,433

(22) Filed: Jan. 29, 2020

(51) Int. Cl.
*G06F 30/394* (2020.01)
*G06Q 30/00* (2012.01)
*G06Q 50/18* (2012.01)
*G06F 115/12* (2020.01)

(52) U.S. Cl.
CPC ....... *G06F 30/394* (2020.01); *G06Q 30/0185* (2013.01); *G06F 2115/12* (2020.01); *G06Q 50/184* (2013.01)

(58) Field of Classification Search
CPC  G06F 30/394; G06F 2115/12; G06Q 30/0185
USPC ........................................................ 716/126
See application file for complete search history.

(56) References Cited

U.S. PATENT DOCUMENTS

| | | | | |
|---|---|---|---|---|
| 7,095,854 B1 * | 8/2006 | Ginter | ..................... | G06F 21/10 380/231 |
| 8,271,240 B2 * | 9/2012 | Jandhyala | ............... | G06F 30/23 703/2 |
| 8,381,161 B1 * | 2/2013 | Andersen | ............. | G06F 30/392 716/119 |
| 8,589,840 B2 * | 11/2013 | Koizumi | ............... | G06F 30/398 716/106 |
| 8,595,662 B1 * | 11/2013 | Yu | .......................... | G06F 30/39 716/110 |
| 8,667,450 B2 * | 3/2014 | Wang | .................... | G06F 30/398 716/136 |
| 9,064,063 B1 * | 6/2015 | Yu | .......................... | G06F 30/00 |
| 10,216,963 B2 * | 2/2019 | Su | .......................... | G06F 30/39 |
| 10,283,459 B2 | 5/2019 | Bhunia | | |
| 10,349,517 B2 | 7/2019 | Logan | | |
| 10,515,180 B1 * | 12/2019 | Sharma | ................. | G06F 30/398 |
| 2002/0048369 A1 * | 4/2002 | Ginter | .................... | G07F 9/026 380/277 |
| 2007/0174638 A1 * | 7/2007 | Fan | ........................ | G06F 21/16 713/193 |
| 2008/0208886 A1 * | 8/2008 | Zhang | ................. | G06F 21/6218 |
| 2009/0319972 A1 * | 12/2009 | Onodera | ............ | G06F 30/3312 716/113 |

(Continued)

*Primary Examiner* — Suresh Memula
(74) *Attorney, Agent, or Firm* — Gregory J. Kirsch

(57) ABSTRACT

Embodiments may provide Digital Rights Management techniques, not to make the reverse engineering process harder, but rather to provide detection of reverse engineering of PCBs, such as by copying of layers of trace layout, so as to enable pursuing legal remedies against the violators. For example, in an embodiment, a method of information encoding may be implemented in a computer comprising a processor, memory accessible by the processor, and computer program instructions stored in the memory and executable by the processor, the method may comprise receiving, at the computer system, information to be encoded in a printed circuit board wiring trace layout and laying out, at the computer system, a plurality of printed circuit board wiring traces so as to encode the received information.

18 Claims, 5 Drawing Sheets

(56) References Cited

U.S. PATENT DOCUMENTS

2019/0243952 A1    8/2019   Dekker
2019/0258769 A1    8/2019   Trujillo

* cited by examiner

DIGITAL RIGHTS MANAGEMENT FOR PRINTED CIRCUIT BOARDS

BACKGROUND

The present invention relates to Digital Rights Management techniques that provide detection of reverse engineering of PCBs, such as by copying of layers of trace layout.

It is expensive to design hardware, while it may be quite simple to illegally duplicate an existing design. The problem with fighting such behavior is the difficulty of proving that the suspected hardware is, indeed, an illegal duplication instead of a legitimate design which happens to be similar to the original hardware.

Infringement of copyrighted material by illegal copying is a widespread practice. It is more difficult to duplicate hardware, but not impossible. For example, Printed Circuit Boards (PCBs) include a number of layers of wiring trace layout to connect leads and terminals of electronic components mounted on the PCB. A number of reverse engineering services exist for reverse engineering printed circuit boards. Such services may simply copy the layout for each layer, thus making it very easy to produce electronic designs that are copies of the original design.

A common practice solution to deter such activity was to make the hardware harder to reverse engineer, such as using tamperproofing (https://en.wikipedia.org/wiki/Tamper-proofing) techniques. In this never-ending cat-and-mouse game, manufacturers may add more and more complex ways to protect their work, which has negative impact on the usability, while the other side evolves into using more sophisticated methods to reverse engineer the design and copy it.

Accordingly, a need arises for techniques that provide detection of reverse engineering of PCBs, such as by copying of layers of trace layout.

SUMMARY

Embodiments may provide Digital Rights Management techniques, not to make the reverse engineering process harder, but rather to provide detection of reverse engineering of PCBs, such as by copying of layers of trace layout, so as to enable pursuing legal remedies against the violators.

For example, in an embodiment, a method of information encoding may be implemented in a computer comprising a processor, memory accessible by the processor, and computer program instructions stored in the memory and executable by the processor, the method may comprise receiving, at the computer system, information to be encoded in a printed circuit board wiring trace layout and laying out, at the computer system, a plurality of printed circuit board wiring traces so as to encode the received information.

In embodiments, printed circuit board wiring traces that encode the received information may not significantly affect functionality of an electronic device including the printed circuit board. The information to be encoded may comprise a signature and/or a serial number. The encoded a signature or a serial number may provide the capability to provide detection of reproduction using reverse engineering of the printed circuit board. The method may further comprise receiving, at the computer system, a printed circuit board wiring trace layout and laying out may comprise modifying the received printed circuit board wiring trace layout so as to encode the received information. The method may further comprise receiving, at the computer system, an electronic schematic and laying out may comprise converting the electronic schematic into a printed circuit board wiring trace layout including printed circuit board wiring traces encoding the received information.

In an embodiment, a system for information encoding may comprise a processor, memory accessible by the processor, and computer program instructions stored in the memory and executable by the processor to perform receiving, at the computer system, information to be encoded in a printed circuit board wiring trace layout and laying out, at the computer system, a plurality of printed circuit board wiring traces so as to encode the received information.

In an embodiment, a computer program product for information encoding may comprise a non-transitory computer readable storage having program instructions embodied therewith, the program instructions executable by a computer, to cause the computer to perform a method comprising receiving, at the computer system, information to be encoded in a printed circuit board wiring trace layout and laying out, at the computer system, a plurality of printed circuit board wiring traces so as to encode the received information.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments may provide Digital Rights Management techniques, not to make the reverse engineering process harder, but rather to provide detection of reverse engineering of Printed Circuit Boards (PCBs), such as by copying of layers of trace layout, so as to enable pursuing legal remedies against the violators.

Embodiments may make each PCB slightly different in a way that will enable finding the source of the duplication and proving that the design's Intellectual Property belongs to original designer.

For example, there is a common practice of introducing intentional errors in mathematical tables, such as tables of logarithms, or in maps, such as non-existent streets. The problem with such techniques is that such intentionally introduced errors may reduce the accuracy of the table or map, and thus reduce their usability. The introduced error may be so small that it hardly affects the product.

Embodiments may use the degrees of freedom that exist in the PCB design to add perturbations that may be used as a unique signature for the design. Embodiments may sign the design once to prove the identity of the designer. Likewise, embodiments may use these perturbations to add a serial number to each board.

Conventional PCB layout optimization programs use the fact that there are many different ways to route the connections on a PCB that result similar electrical behavior. For example, connecting a line via from (10,10) to (11,11) can be done as (10,10)-=>(10,11)-=>(11,11) and as (10,10)-=> (11,10)-=>(11,11). Embodiments may use this property to encode a signature and/or serial number onto the PCB.

Figure 1:
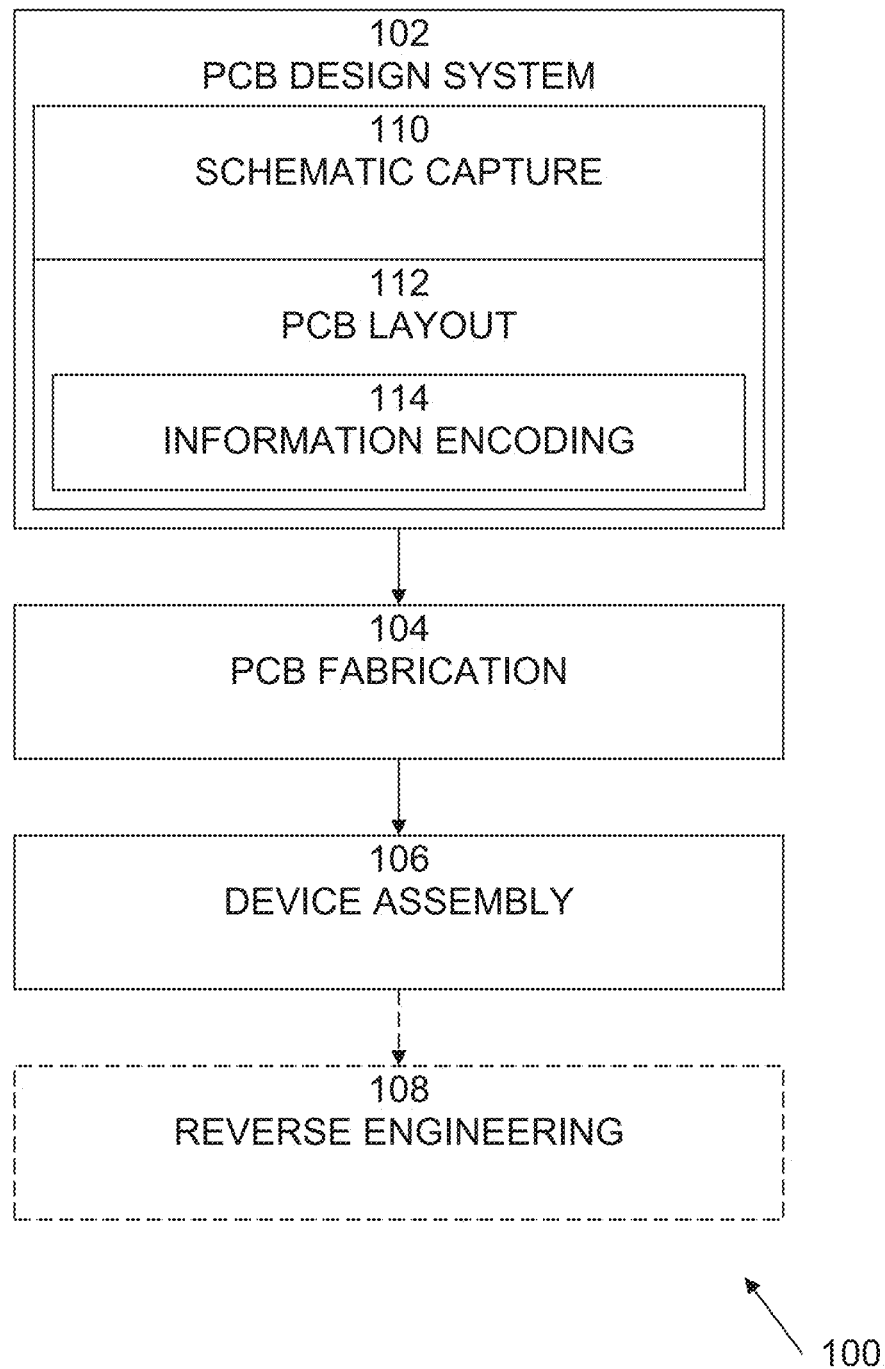
FIG. 1 is an exemplary diagram of a PCB design and fabrication environment according to embodiments of the present techniques.
Figure 2:
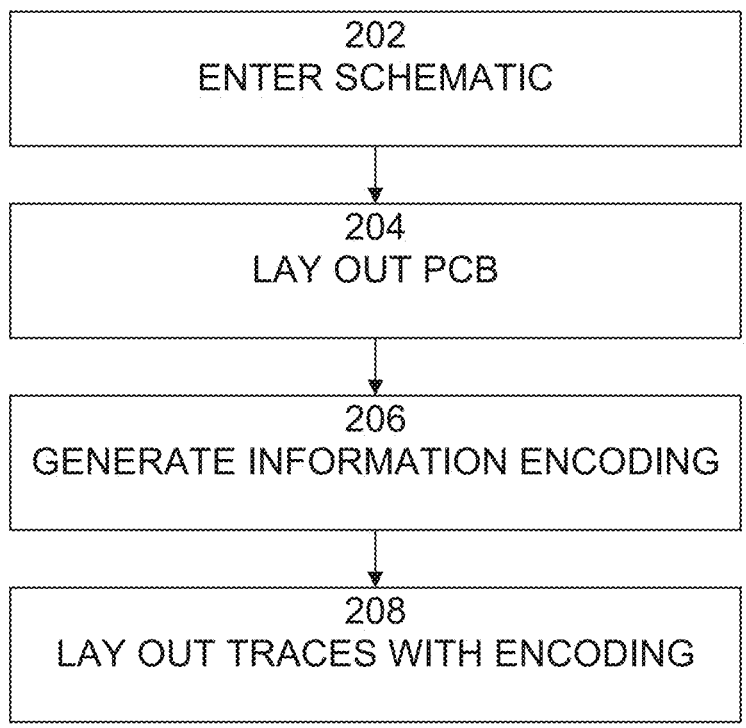
FIG. 2 is an exemplary flow diagram of a process of encoding information in PCB traces according to embodiments of the present techniques.

An exemplary embodiment of a PCB design and fabrication environment 100, in accordance with embodiments of the present systems and methods, is shown in FIG. 1. It is best viewed in conjunction with FIG. 2, which is an exemplary flow diagram of a process of encoding information in PCB traces. Environment 100 may include PCB design system 102, PCB fabrication 104, device manufacturing 106, and may further include reverse engineering 108. PCB design system 102 typically includes a computer system, such as a personal computer or workstation, running schematic capture software 110 and PCB layout software 112, and may be running additional software, such as simulation software, etc. At 202, a user, designer, other person, or automated system may enter a schematic diagram using schematic capture software 110, which may provide the capability for an electronic diagram or schematic of the electronic circuit being designed to be created by a designer. This may be done interactively using schematic capture software 110. Such circuit design may be the first step in designing an electronic circuit. Schematic capture software 110 may provide electronic circuit simulation capabilities, or such simulation capabilities may be provided by additional software. Many such schematic capture applications and packages are well-known, and embodiments may utilize any such schematic capture software and/or the electronic schematic data output from any such software, whether well-know or not, whether standard or proprietary, etc.

At 204, PCB layout software 112 may be used to convert an electronic schematic designed using schematic capture software 110 into one or more PCB trace routing layouts. PCB layout software 112 may provide the capability to place electronic components at locations in a design layout and to route and place wiring traces connecting the terminals of such electronic components. Placement may utilize factors such as total wirelength minimization, signal timing considerations, congestion of trace routing, power minimization and distribution, etc. Trace routing may layout the wiring traces to connect all utilized terminals of the placed components in accordance with design rules for the particular electronic components and PCB technology being used. In addition to the requirement to connect all utilized terminals and the design rules, routing may utilize further factors such as signal timing considerations, crosstalk problems, metal density requirements, antenna effects, etc. In embodiments, PCB layout software 112 may output PCB trace routing layout data in one or more standard or proprietary formats.

At 206, information encoding software 114 may be used to encode information, such as a signature and or serial number, in the layout of the wiring traces. At 208, wiring traces encoding the information may be laid out on the PCB. In embodiments, information encoding software 114 may be included in PCB layout software 112 and may affect the operation of PCB layout software 112 so as to generate and route wiring traces to encode information, while maintaining compliance with the known placement and routing factors. In embodiments, information encoding software 114 may be applied to an otherwise finished PCB layout output by PCB layout software 112 and may modify the layout so as to generate and route wiring traces to encode information, while maintaining compliance with the known placement and routing factors.

PCB fabrication 104 may include well-known facilities and processes to fabricate and manufacture PCB using the PCB trace routing layout data generated by PCB design system 102. Device assembly 106 may include well-known facilities and processes to assemble and manufacture finished electronic devices that use PCBs fabricated using the PCB trace routing layout data generated by PCB design system 102. Reverse engineering 108 may include well-known or proprietary facilities and processes to reverse engineer and duplicate PCBs found in electronic devices.

Figure 3:
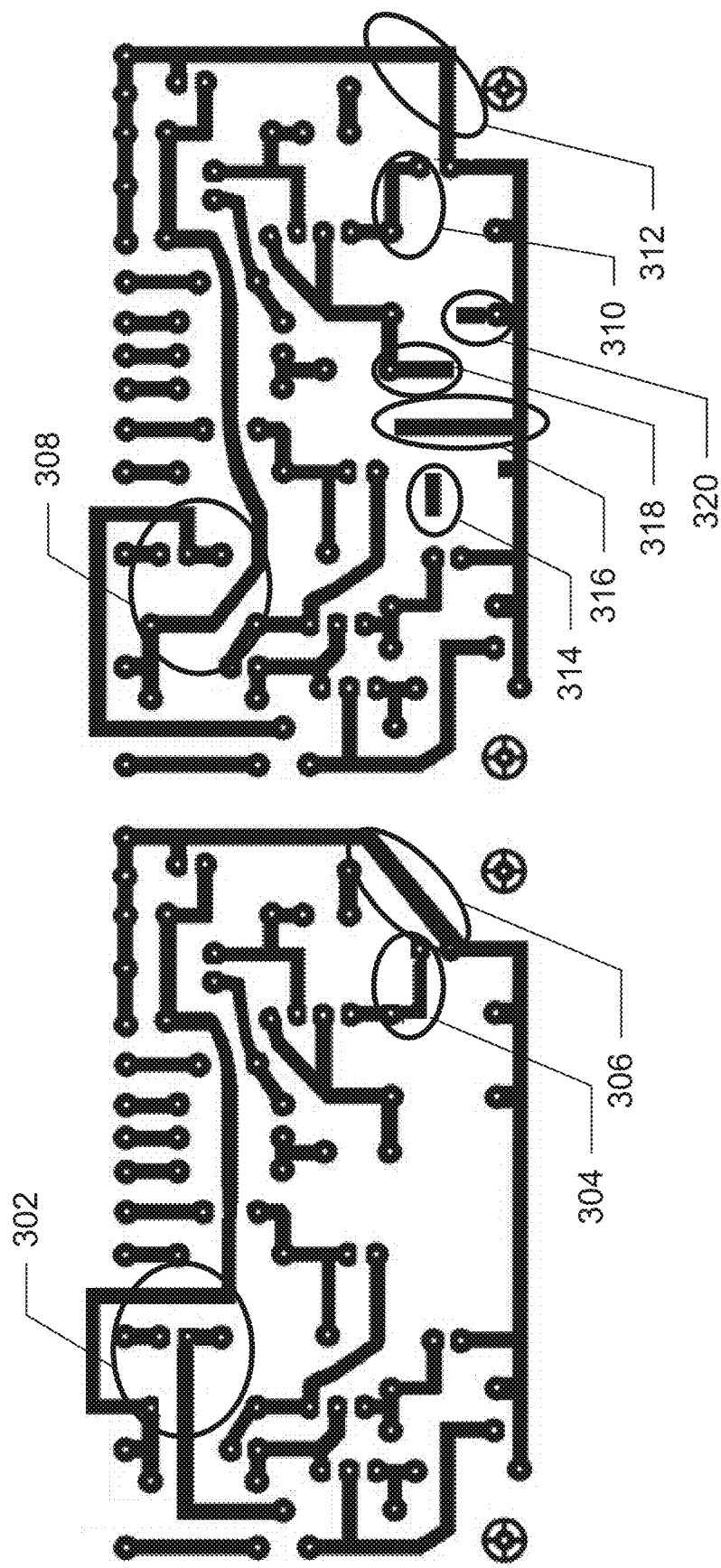
FIG. 3 is a diagram of examples of PCB trace encoding techniques according to embodiments of the present techniques.

Examples of PCB trace encoding techniques are shown in FIG. 3. PCB features 302, 304, and 306 are shown as examples of the same connective functionality provided by different implementations. Feature 302 may be implemented, for example, as shown at 302 or alternatively, as shown at 308. Feature 304 may be implemented, for example, as shown at 302 or alternatively, as shown at 310. Feature 306 may be implemented, for example, as shown at 302 or alternatively, as shown at 312. Features 314, 316, 318, and 320 are shown as example of redundant traces, that is, traces that do not significantly affect functionality of the electronic device including the PCB. By combining a plurality of such features, including features having the same connective functionality but different implementations, redundant features, or both, information, such as a signature or serial number may be encoded.

Figure 5:
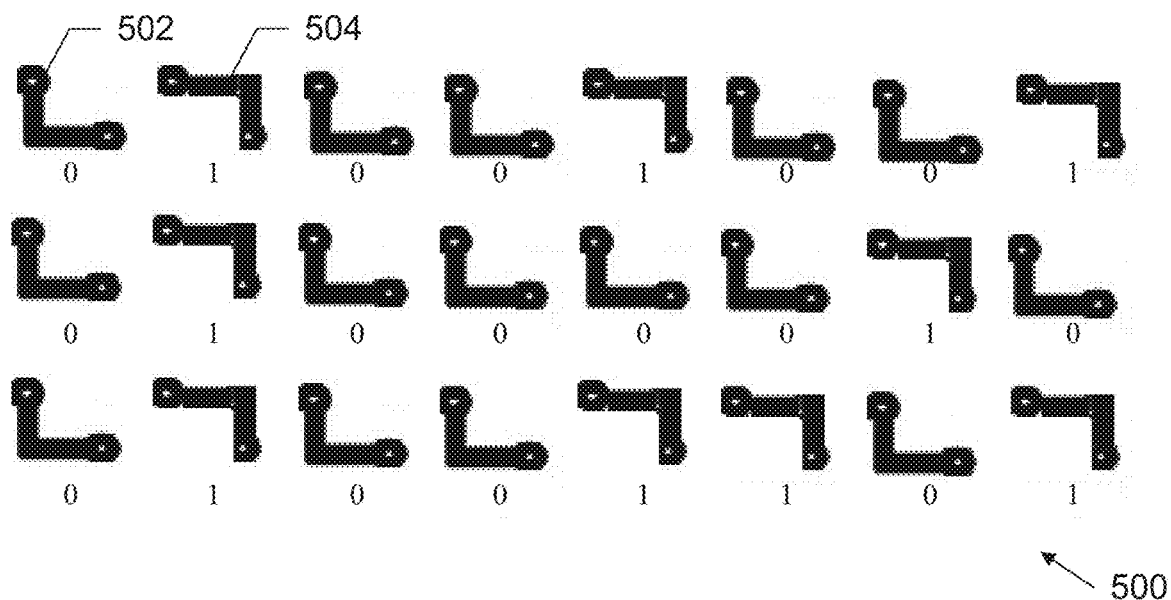
FIG. 5 is an exemplary diagram of information encoded in PCB traces according to embodiments of the present techniques.
Figure 6:
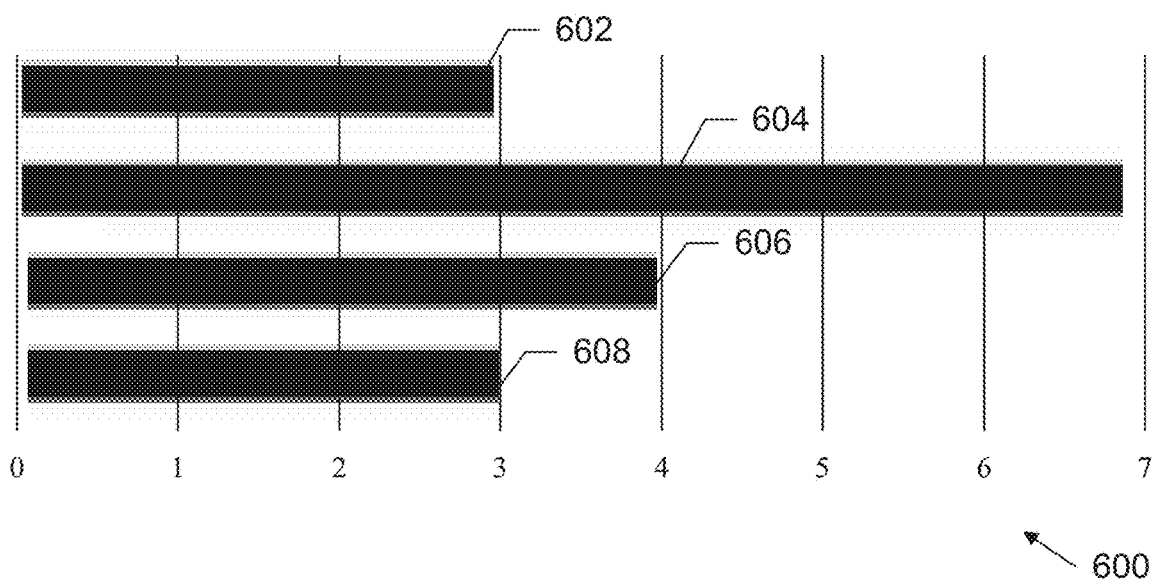
FIG. 6 is an exemplary diagram of information encoded in PCB traces according to embodiments of the present techniques.

Examples of information encoded in PCB traces are shown in FIGS. 5 and 6. For example, in FIG. 5, the term "IBM" is shown encoded in PCB trace patterns 500. IBM, in ASCII, is 0x49 0x42 0x4D which is binary 01001001 01000010 01001101. The binary "1"s and "0"s may be represented by distinguishable elements. For example, a binary "0" may be represented by PCB trace element 502, while a binary "1" may be represented by distinguishable PCB trace element 504. The ASCII character string may be represented by a series of such elements 502, 504. For example, in FIG. 6, the number "2019" is shown encoded in PCB trace patterns 600. The number "2019" which in octal is 3743, may be encoded in 4 variable length trace bars 602-608. For example, the octal digit "3" may be represented as a trace bar 602 of length "3", the octal digit "7" may be represented as a trace bar 604 of length "7", the octal digit "4" may be represented as a trace bar 606 of length "4", the octal digit "3" may be represented as a trace bar 608 of length "3". It is to be noted that the present techniques are applicable to and may utilize any type or form of encoding, not just the specific examples described herein.

Figure 4:
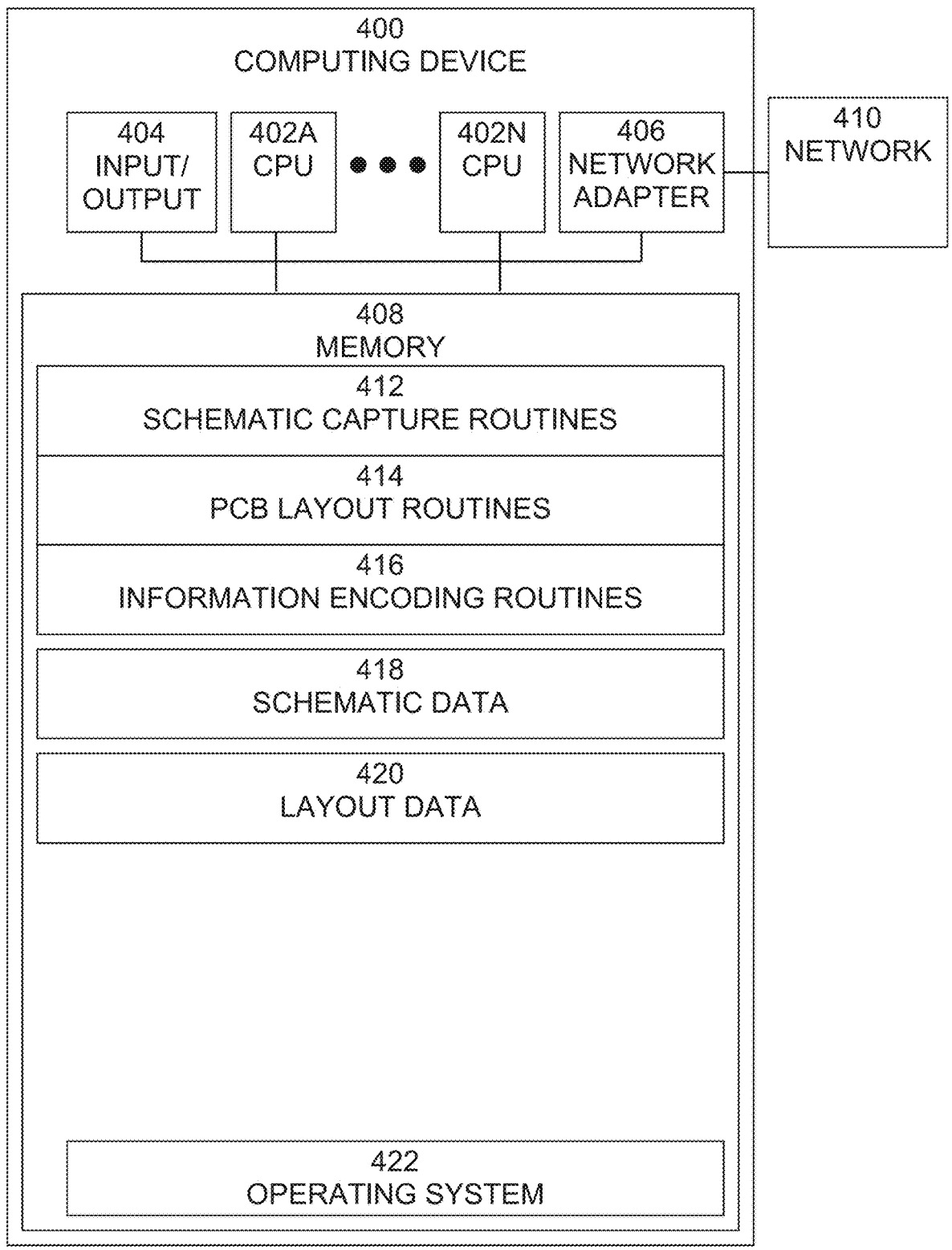
FIG. 4 is an exemplary block diagram of a computer system, in which processes involved in the embodiments described herein may be implemented.

An exemplary block diagram of a computer system 400, in which processes involved in the embodiments described herein may be implemented, is shown in FIG. 4. Computer system 400 may be implemented using one or more programmed general-purpose computer systems, such as embedded processors, systems on a chip, personal computers, workstations, server systems, and minicomputers or mainframe computers, or in distributed, networked computing environments. Computer system 400 may include one or more processors (CPUs) 402A-402N, input/output circuitry 404, network adapter 406, and memory 408. CPUs 402A-402N execute program instructions in order to carry out the functions of the present communications systems and methods. Typically, CPUs 402A-402N are one or more microprocessors, such as an INTEL CORE® processor or an IBM POWER® processor. FIG. 4 illustrates an embodiment in which computer system 400 is implemented as a single multi-processor computer system, in which multiple processors 402A-402N share system resources, such as memory 408, input/output circuitry 404, and network adapter 406. However, the present communications systems and methods also include embodiments in which computer system 400 is implemented as a plurality of networked computer systems, which may be single-processor computer systems, multi-processor computer systems, or a mix thereof.

Input/output circuitry 404 provides the capability to input data to, or output data from, computer system 400. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computer system 400. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 may vary depending upon the function that computer system 400 is programmed to perform. In the example shown in FIG. 4, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 4, memory 408 may include schematic capture routines 412, PCB layout routines 414, information encoding routines 416, schematic data 418, PCB layout data 420, and operating system 422. Schematic capture routines 412 may include software routines to provide the capability for an electronic diagram or schematic of the electronic circuit being designed to be created by a designer, as described above. PCB layout routines 414 may include software routines to convert an electronic schematic designed using schematic capture routines 412 into one or more PCB trace routing layouts, as described above. Information encoding routines 416 may include software routines to encode information, such as a signature and or serial number, in the layout of the wiring traces, as described above. Schematic data 418 may include data defining an electronic diagram or schematic of the electronic circuit, as described above. PCB layout data 420 may include data defining PCB trace routing layouts, as described above. Operating system 422 may provide overall system functionality.

As shown in FIG. 4, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of information encoding, implemented in a computer comprising a processor, memory accessible by the processor, and computer program instructions stored in the memory and executable by the processor, the method comprising:
   receiving, at the computer system, information to be encoded in a printed circuit board wiring trace layout; and
   laying out, at the computer system, a plurality of printed circuit board wiring traces so as to encode the received information, wherein degrees of freedom in the printed circuit board wiring trace layout are used to add perturbations to the trace layout, wherein the perturbations encode the received information.

2. The method of claim 1, wherein printed circuit board wiring traces that encode the received information do not significantly affect functionality of an electronic device including the printed circuit board.

3. The method of claim 2, wherein the information to be encoded comprises a signature or a serial number.

4. The method of claim 3, wherein the encoded a signature or a serial number provides the capability to provide a proof that a copy of the PCB has been made using reverse engineering of the original printed circuit board.

5. The method of claim 2, further comprising receiving, at the computer system, a printed circuit board wiring trace layout and laying out comprises modifying the received printed circuit board wiring trace layout so as to encode the received information.

6. The method of claim 2, further comprising receiving, at the computer system, an electronic schematic and laying out comprises converting the electronic schematic into a printed circuit board wiring trace layout including printed circuit board wiring traces encoding the received information.

7. A system for information encoding, the system comprising a processor, memory accessible by the processor, and computer program instructions stored in the memory and executable by the processor to perform:
   receiving, at the computer system, information to be encoded in a printed circuit board wiring trace layout; and
   laying out, at the computer system, a plurality of printed circuit board wiring traces so as to encode the received information, wherein degrees of freedom in the printed circuit board wiring trace layout are used to add perturbations to the trace layout, wherein the perturbations encode the received information.

8. The system of claim 7, wherein printed circuit board wiring traces that encode the received information do not significantly affect functionality of an electronic device including the printed circuit board.

9. The system of claim 8, wherein the information to be encoded comprises a signature or a serial number.

10. The system of claim 9, wherein the encoded a signature or a serial number provides the capability to provide detection of reverse engineering of the printed circuit board.

11. The system of claim 8, further comprising receiving, at the computer system, a printed circuit board wiring trace layout and laying out comprises modifying the received printed circuit board wiring trace layout so as to encode the received information.

12. The system of claim 8, further comprising receiving, at the computer system, an electronic schematic and laying out comprises converting the electronic schematic into a printed circuit board wiring trace layout including printed circuit board wiring traces encoding the received information.

13. A computer program product for information encoding, the computer program product comprising a non-transitory computer readable storage having program instructions embodied therewith, the program instructions executable by a computer, to cause the computer to perform a method comprising:
   receiving, at the computer system, information to be encoded in a printed circuit board wiring trace layout; and
   laying out, at the computer system, a plurality of printed circuit board wiring traces so as to encode the received information, wherein degrees of freedom in the printed circuit board wiring trace layout are used to add perturbations to the trace layout, wherein the perturbations encode the received information.

14. The computer program product of claim 13, wherein printed circuit board wiring traces that encode the received information do not significantly affect functionality of an electronic device including the printed circuit board.

15. The computer program product of claim 14, wherein the information to be encoded comprises a signature or a serial number.

16. The computer program product of claim 15, wherein the encoded a signature or a serial number provides the capability to provide detection of reverse engineering of the printed circuit board.

17. The computer program product of claim 14, further comprising receiving, at the computer system, a printed circuit board wiring trace layout and laying out comprises modifying the received printed circuit board wiring trace layout so as to encode the received information.

18. The computer program product of claim 14, further comprising receiving, at the computer system, an electronic schematic and laying out comprises converting the electronic schematic into a printed circuit board wiring trace layout including printed circuit board wiring traces encoding the received information.

* * * * *